(No Model.)
BEST AVAILABLE COPY
L. GUTMANN.
ALTERNATING CURRENT MOTOR AND METHOD OF OPERATING SAME.
No. 530,176. Patented Dec. 4, 1894.
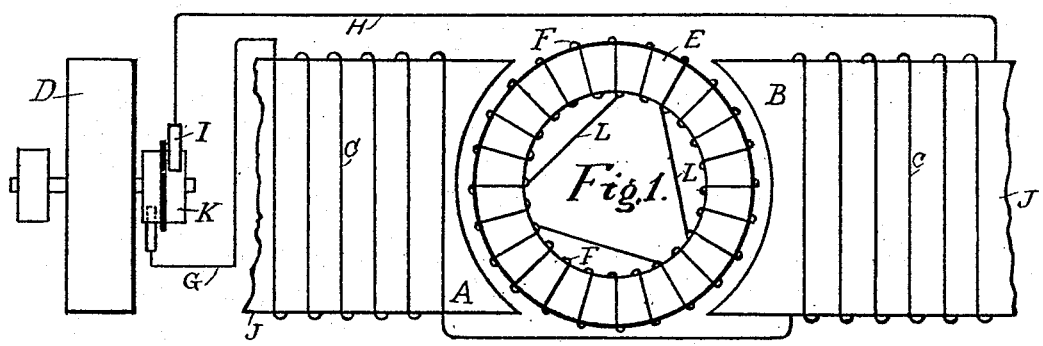
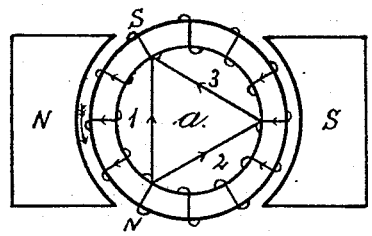
Fig. 2.
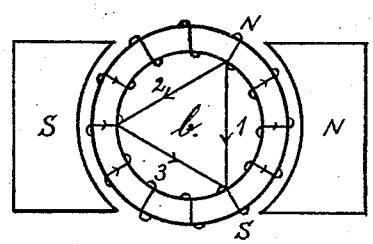
Fig. 3.
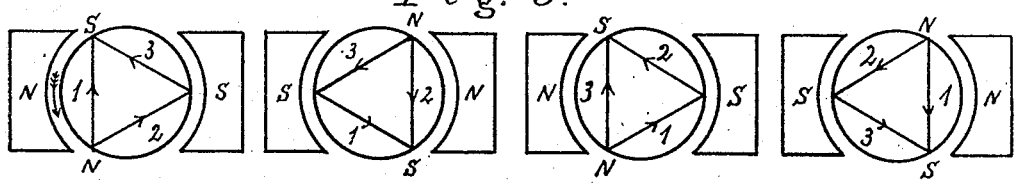
Fig. 4.
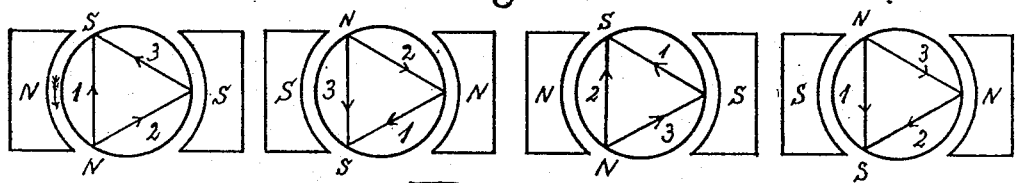
Fig. 5.
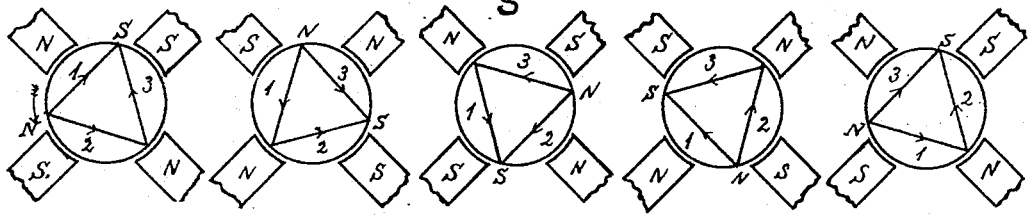
Witnesses:
John R. Findley
Elizabeth M. Findley
Inventor.
Ludwig Gutmann
By his Attorney
Edward P. Thompson
THE NORRIS PETERS CO., PHOTO-LITHO., WASHINGTON, D. C.

# UNITED STATES PATENT OFFICE.

LUDWIG GUTMANN, OF PITTSBURG, PENNSYLVANIA.

ALTERNATING-CURRENT MOTOR AND METHOD OF OPERATING SAME.

SPECIFICATION forming part of Letters Patent No. 530,176, dated December 4, 1894.

Application filed October 30, 1889. Serial No. 328,641. (No model.)

*To all whom it may concern:*

Be it known that I, LUDWIG GUTMANN, a subject of the German Emperor, residing at Pittsburg, in the county of Allegheny and State of Pennsylvania, have invented certain new and useful Improvements in Alternating-Current Motors and Methods of Operating Same, of which the following is a full, clear, concise, and exact description, reference being had to the accompanying drawings, forming a part of this specification.

My invention relates to a novel method of producing rotation in an electric motor for power transmission purposes.

The invention in short consists in producing or inducing by means of a single energizing current in one conductor polyphase currents in another conductor and in consequence a resultant rotary magnetic field.

Figure 1, represents the device in diagram. Figs. 2, 3, 4 and 5 are diagrams explaining the action in the armature Fig. 1.

Referring in particular to Fig. 1 A, B, are the two field magnet poles of magnet J which is provided with the energizing coil C. This winding is connected by means of conductors G H to the brushes I, and collector K of a suitable generator D of alternating, pulsating or intermittent currents. An armature is placed in the field of this magnet. Its core E is surrounded by the winding F and furthermore the winding is provided with cross connecting conductors, or close circuiting conductors L. The figure represents no particular mechanical construction but a diagram only, which will enable the explanation of the underlying principle. It may however be stated, that the field and armature windings, also the numbers of poles and close circuited armature coils may be multiplied as now well known and described in other patents, for instance No. 463,314, without departing from the nature of the invention.

If D is an alternating current dynamo or transformer, and from it a current should be sent through the field magnet winding C, currents would be induced in the armature winding, owing to the closed circuits, which act differentially and establish poles, which cause the armature to move so as to re-establish magnetic equilibrium, and this is reached, when all closed circuits are so placed in the magnetic field that the sum of their currents is zero. It is therefore evident, that if the armature has not this position to begin with it will start from state of rest but will come to rest, as soon as the short circuited windings have as near as possible a symmetrical position with regard to the field poles, when the armature will be currentless. This is however, not the case with all constructions, for if the alternations are not very high and the field poles comparatively far apart, the first initial impulse may cause the armature to pick up in speed when running without a load, and arrive or pass a certain speed which has to be reached for it to continue to accelerate and run in harmony with the alternations. With ordinary constructions desirable for efficient motors the self-starting would be uncertain, and this therefore is a weak point for a commercial machine. This uncertainty increases with increase of alternations or decrease of poles and closed circuited windings. If, however, by some suitable mechanical, electrical or electro magnetic means, for instance by a quickly given impulse of rotary motion manually imparted to the shaft, the armature is brought over a certain speed, which I will call its critical speed, then it will continue to increase in speed, and run at synchronous or slightly below synchronous speed, which facts have been found experimentally.

With an unequal or different number of close circuits from that of the pole pieces, the close circuited windings produce a differential action, which is the cause, that the torque at the start is very low or zero, but when an armature coil in rotation, normally close circuited, passes from one pole to the other in the time of one-half period and attains the same position in front of this pole, it is evident, that the force, which gave this coil the first impulse, will cause it to rotate in the same direction.

The construction of the armature disclosed in the diagrams differs from those heretofore used in practice. It is a commutatorless machine, whose winding contains close circuits in electrical connection with one another.

To facilitate the explanation, it may be assumed, that the three conductors L are directly in touch with each other and divide the armature winding in but three subcircuits of equal sizes, and in electric connection with one another, which assumption is permissible, inasmuch as the principle involved is the same in both cases. It will be seen, that one coil is in parallel to the other two, which latter are in series across the terminals of the first named coil. Each of these coils as it passes through a magnetic field or passes in front of a pole, generates two current impulses, which distribute themselves over the winding through the various passages offered, according to well known laws. However, those currents in the three coils are not simultaneous, because the closed circuits have not identical position to the field magnet poles as they differ in number therefrom.

Fig. 2 presents the armature running at synchronous speed. The two positions $a$ and $b$ show, that the armature poles remain practically stationary in the armature core. It will be noticed, that coils 1 and 3 are acting in the same sense, coil 2 in opposition. Rotation is mainly due to coil 1, while the others at this position neutralize each other or are nearly equal and opposite. The consequence is the formation of poles N and S, and rotation in counter clock-wise direction. Position $b$ indicates the distance, which the armature rotates in one-half period and shows the field poles reversed. Evidently the poles in the armature remain stationary and rotate with it. If we however consider, that the armature is symmetrical and that it should be indifferent to the action of the machine which coil reaches the point where another ought to have arrived, we may obtain another synchronous speed. This is indicated in Fig. 3. This set of four diagrams in which the coils are indicated by the number, the winding being omitted, shows a difference in regard to Fig. 2, as coil 1 does not reach the north pole again, but coil 2 takes the identical position and evidently rotation will be the consequence. Similarly at the next half impulse coil 2 cannot reach the other pole. However, coil 3 does, and in this way the three coils exchange position with one another. However, the north and south poles no longer are stationary with one coil, as in Fig. 2 where the poles rotate with coil 1.

In the present case the poles change from coil 1 to 2 to 3; 1, 2 and 3, &c., and also the working of the coils in the same sense changes; in the first position coils 1 and 3, in the second coils 2 and 1, in the third coils 3 and 2 are working together, while the third either carries no current or else is in opposition. Following the arrows in the various positions, we notice, that they naturally would change their direction, and that the currents in the different sub-circuits differ in phase by one hundred and twenty degrees, but if we examine now into the position of the poles we observe, that they travel in this particular case at a different rate from the armature and in opposite direction. Looking at the first and third positions we observe, that coil 1 has made but one-third of a revolution, while the magnetic poles have traveled once around, or in other words the magnetic field of the armature makes three revolutions in one direction, while the armature itself rotates but once in the opposite direction. The fourth position it will be noticed, shows the armature after one-half revolution. The close circuited coil 1 stands again in front of a north pole, in spite of having a position opposite to that shown in the first diagram of Fig. 3. Evidently the armature will now undergo the same changes and in the same order with the right hand pole as north pole (fourth position) as it has undergone before, starting with coil No. 1 in front of the left hand pole piece as a north pole. In this case the armature itself has a speed of one-sixth revolution per half period. Another harmonic speed is admissible, in which the armature makes one-third of a revolution per half alternation. This is shown in Fig. 4. In these four diagrams the coils exchange position of maximum activity, but not as in the former case in front of a pole of the same polarity. It will be noticed, that with this particular harmonic speed every one of these close circuited coils passes through the same field of maximum magnetic flux. Every one has its greatest torque when in front of the same core portion. Nevertheless as the field energizing current is an alternating current this same core part must change its sign. The speed of rotation of these three closed coils, 1, 2, and 3, is pointed out as follows: If coil 1 stands in front of a fully developed north pole, it rotates in counter clockwise direction, and by the time that coil No. 3 reaches the position occupied by coil No. 1 the north pole has died out, changed into a south pole and reached its normal strength. By the time that coil No. 2 reaches the position just held by coil No. 3 the polarity has changed again to north; the next coil will stand in front of the same core part when it has changed again to a south pole. It will thus be clear, while in Fig. 3 all coils of maximum activity stand before alternate core parts having all the same polarity, viz: north, the condition presented in Fig. 4 shows all coils of maximum activity in front of the same core part however the polarity alternates, so that coil No. 1 stands in front of a north pole, while coil No. 3 a moment later stands in front of a south pole, coil No. 2 stands in front of a north pole and so on. The fourth position shows, that the armature has made a complete revolution however the poles are reversed; evidently the poles travel at a different rate; they have rotated one and a half times in the opposite direction.

Inasmuch as the change of polarity appears too abrupt, and especially as the armature poles travel at different speeds in the core, this action may be shown more gradual in a four-pole field Fig. 5.

The five diagrams show the armature in synchronism with the alternations. All three coils in turn stand in front of a north pole but not before the identical piece of iron. In fact, owing to the difference of armature coils and field poles, different core portions are used having the desired polarity, viz: for the armature coil of maximum action the field poles are rotating in clockwise direction. It will thus be clear, that if the close circuits operate at this harmonic speed with the alternations, the alternating field exercises the same identical effect on the armature as a rotary magnetic field applied to the stationary magnet. Following now the poles, we see, that the armature poles change from coil 1, to 3, to 2 to 1, to 3 to 2, &c. In respect to the armature coils the alternating field fluxes seem to rotate in clockwise direction, because for them constantly progressive core parts are the seat of maximum magnetic flux of the same polarity, which periodically and progressively react on closed armature coils, angularly displaced from one another. It will also be noticed, that in the fifth position the armature has traveled but a third revolution, but we are now enabled to follow the traveling armature poles and notice, that in one-third armature revolution the magnetic poles have made a complete revolution. The rotary magnetic field in the armature is due to periodic and successive excitation of the coils, and also to the distribution discharge or circulation of the currents induced, to other parts of the winding, having a lower difference of potential and being angularly displaced, thereby converting the rotary core into three systems whose magnets are angularly displaced and whose poles vary in strength and intensity with the currents causing them. This class of motors belongs to the synchronous type, but synchronism in this case is not only the one speed $\frac{n}{p}$, where $n$ is the number of alternations and $p$ is the number of field poles, but it may vary from that speed to others, down to $\frac{n}{pp'}$, where $p'$ is the number of close circuited armature coils. The greatest torque however, lies between the numerical values $\frac{n}{p}$ and $n$ divided by the smallest common factor between $p$ and $p'$.

In the present case the motor Fig. 1 has been shown to possess three synchronous speeds. This synchronism is desirable for the efficient working of the motor. This motor has the good qualities of a polyphase motor in having the capacity of remaining in synchronism, but of changing from one speed into another; that is to say, if due to load a certain coil cannot reach its proper position, a heavier current will be generated in the coil ahead, which causes an increase in torque, and the armature goes on, but this takes place only between limits, and if the lowest synchronous speed is passed the motor will come to a standstill like every other overworked synchronous motor. If the motor has nine closed circuits instead of three, it is evident, that also the motor speed can vary between wider limits than with three as indicated by above formula, other conditions remaining as before. It will be clear further, that in the particular case Fig. 1, there would be generated a system of three currents lagging behind one another one hundred and twenty degrees, which are due to two forces: One is an alternating current or a field of variable intensity, the second is rotation. The magnetic field around the armature becomes within limits the more constant the greater the number of close circuited coils, and the greater therefore the number of currents which lag behind one another in phase.

By having six closed circuits the periodic currents would be six, which depending on the connection may lag behind one another by sixty degrees, or may form two systems displaced in regard to one another and each three lag one hundred and twenty degrees behind each other. Again, other number of closed coils may be used for such armature systems, for instance, 7, 11, 21, and they would be producing as many currents lagging in phase from a single source. With the increased number of close circuited coils the magnetization would be more regular and the changes from one speed to another less marked.

The diagrams Figs. 3, 4 and 5 have disclosed that there are two forces acting against one another. Each is produced by periodic currents lagging in phase. The forces predominating establish a rotary field in clockwise direction. If we consider however for a moment the opposing force or forces alone, it is evident that, being periodic currents lagging in phase and displaced from one another angularly around a common center, they also produce a rotary magnetic field however weaker than the former, and their field would rotate in the opposite direction to the one named first, so that in reality two rotary fields are created, the resultant of which is shown in the diagrams.

What I claim as my invention is—

1. The method herein described of operating an alternating or pulsatory current motor which consists in magnetizing one of the elements (the field) by a single energizing circuit and producing a continuously progressive shifting of the magnetic polarities in the other motor element (the armature) by developing currents differing in phase and current quantity in different closed circuits of a winding of said element.

2. The herein described method of transforming electrical energy into mechanical, consisting in energizing one of the motor elements (the field) normally by a single phase alternating electric current, and progressively changing the position of the magnetic poles of the other element (the armature) by periodic currents differing in phase.

3. The method herein described of producing mechanical motion from electrical energy, consisting in establishing a field of rapidly varying intensity by a single phase alternating or pulsatory current, and producing in a motor element whose winding is exposed to said field of force polyphase currents in successive closed circuits of said winding.

4. The method herein described of producing mechanical motion from electrical energy, consisting in establishing by means of a single phase alternating current, a field of rapidly varying intensity for one of the elements of a motor, and producing polyphase currents in interconnected closed windings, and thereby developing a rotary magnetic field for the second element, as herein set forth.

5. The combination with a source of single phase alternating currents, of a motor provided with field magnet coils all of which are electrically connected in circuit with said source, and an armature provided with interconnected circuits the number thereof being different from the number of field poles or positions of maximum magnetic flux, whereby the motor may run harmoniously at more than one speed substantially as described.

In testimony that I claim the foregoing as my invention I have signed my name, in presence of two witnesses, this 24th day of October, 1889.

LUDWIG GUTMANN.

Witnesses:
E. G. DUVALL, Jr.,
EDWARD P. THOMPSON.